(12) United States Patent
Yu et al.

(10) Patent No.: US 7,697,432 B2
(45) Date of Patent: Apr. 13, 2010

(54) EQUAL AND WEIGHTED COST MULTIPATH LOAD BALANCING IN A NETWORK DEVICE

(75) Inventors: Song-huo Yu, San Jose, CA (US); Yih-Chuan S. Chen, San Jose, CA (US); Jeff Dull, San Jose, CA (US)

(73) Assignee: Broadcom Corporation, Irvine, CA (US)

(*) Notice: Subject to any disclaimer, the term of this patent is extended or adjusted under 35 U.S.C. 154(b) by 1231 days.

(21) Appl. No.: 10/874,574

(22) Filed: Jun. 24, 2004

(65) Prior Publication Data

US 2004/0264374 A1     Dec. 30, 2004

Related U.S. Application Data

(60) Provisional application No. 60/527,840, filed on Dec. 9, 2003, provisional application No. 60/482,760, filed on Jun. 27, 2003.

(51) Int. Cl.
G08C 15/02    (2006.01)
H04L 12/56    (2006.01)
G06F 15/173   (2006.01)
G06F 15/16    (2006.01)

(52) U.S. Cl. .................. 370/235; 370/392; 370/397; 370/409; 709/223; 709/239; 709/245

(58) Field of Classification Search .......... 370/392, 370/389, 235, 255, 409, 397; 709/238, 242, 709/223, 245
See application file for complete search history.

(56) References Cited

U.S. PATENT DOCUMENTS

| 5,918,074 | A  |   | 6/1999  | Wright et al. |
| 5,978,951 | A  | * | 11/1999 | Lawler et al. ............... 714/758 |
| 5,991,295 | A  |   | 11/1999 | Tout et al. |
| 6,603,765 | B1 | * | 8/2003  | Wilford et al. ......... 370/395.32 |
| 7,047,317 | B1 | * | 5/2006  | Huie et al. .................. 709/245 |
| 7,123,620 | B1 | * | 10/2006 | Ma ....................... 370/395.32 |

(Continued)

FOREIGN PATENT DOCUMENTS

EP     0981228 A2    2/2000

(Continued)

OTHER PUBLICATIONS

Pankaj Gupta, "Routing Lookups in Hardware at Memory Access Speeds," 1998, 0-7803-4383-2/98, p. 1,2.*

(Continued)

*Primary Examiner*—Dang T Ton
*Assistant Examiner*—Ryan C Kavleski

(57) ABSTRACT

A method of mediating the flow of datagrams to a destination in a network is disclosed. The method includes the steps of receiving a datagram at a port of a network device, evaluating a destination address for the datagram based on fields in the incoming packet, searching a longest prefix match (LPM) table using the destination address as a LPM key, determining an address table index and an offset based on entries found in the search of the longest prefix match table, searching an address table using the address table index and the offset as an address key to determine an egress port number of the network device and forwarding the packet based upon at least the egress port number.

13 Claims, 8 Drawing Sheets

U.S. PATENT DOCUMENTS

| | | | |
|---|---|---|---|
| 7,190,696 B1* | 3/2007 | Manur et al. | 370/392 |
| 2002/0012345 A1* | 1/2002 | Kalkunte et al. | 370/389 |
| 2002/0012585 A1* | 1/2002 | Kalkunte et al. | 415/137 |
| 2002/0172203 A1* | 11/2002 | Ji et al. | 370/392 |
| 2003/0069973 A1* | 4/2003 | Ganesan et al. | 709/226 |
| 2004/0008675 A1* | 1/2004 | Basso et al. | 370/389 |
| 2004/0062208 A1* | 4/2004 | Brown et al. | 370/256 |
| 2004/0235480 A1* | 11/2004 | Rezaaifar et al. | 455/445 |
| 2004/0264380 A1* | 12/2004 | Kalkunte et al. | 370/238 |

FOREIGN PATENT DOCUMENTS

| | | |
|---|---|---|
| EP | 1093266 A2 | 4/2001 |
| FR | 2725573 | 4/1996 |
| WO | WO 01/24428 A1 | 4/2001 |

OTHER PUBLICATIONS

D. Thaler, "RFC 2991: Multipath Issues in Unicast and Multicast Next-Hop Selection," Nov. 2000.*

Zhang Baoxian, "A Multipath Multicast Routing Algorrithm," 1999, p. 2.*

"Computer Networks," A.S. Tannenbaum, Prentice-Hall Int., USA, XP-002147300(1998), Sec. 5.2-Sec 5.3, pp. 309-320.

* cited by examiner

EQUAL AND WEIGHTED COST MULTIPATH LOAD BALANCING IN A NETWORK DEVICE

REFERENCE TO RELATED APPLICATIONS

This application claims priority of U.S. Provisional Patent Application Ser. No. 60/482,760, filed on Jun. 27, 2003 and Ser. No. 60/527,840, filed on Dec. 9, 2003. The subject matter of this earlier filed application is hereby incorporated by reference.

BACKGROUND OF THE INVENTION

1. Field of the Invention

The present invention relates to devices, software applications and networks that utilize data that is sent or received over data communication or computer networks. In particular, the present invention is directed to a network device and methods that allow for the balancing of loads on multiple paths to destinations. The processor and methods described provide greater flexibility in balancing the load of datagrams along multiple internet protocol destination paths.

2. Description of Related Art

As computer performance has increased in recent years, the demands on computer networks has significantly increased; faster computer processors and higher memory capabilities need networks with high bandwidth capabilities to enable high speed transfer of significant amounts of data. The well-known Ethernet technology, which is based upon numerous IEEE Ethernet standards, is one example of computer networking technology which has been able to be modified and improved to remain a viable computing technology.

Based upon the Open Systems Interconnect (OSI) 7-layer reference model, network capabilities have grown through the development of repeaters, bridges, routers, and, switches, which operate with various types of communication media. Collectively, with respect to the present invention, all of these may be referred to as network devices. Switches, as they relate to computer networking and to Ethernet, are hardware-based devices which control the flow of datagrams, data packets or cells based upon destination address information which is available in each packet. A properly designed and implemented switch should be capable of receiving a packet and switching the packet to an appropriate output port at the maximum speed capability of the particular network.

Referring to the OSI 7-layer reference model discussed previously, the higher layers typically have more information. Various types of products are available for performing switching-related functions at various levels of the OSI model. Hubs or repeaters operate at layer 1, and essentially copy and "broadcast" incoming data to a plurality of spokes of the hub. Layer 2 switching-related devices are typically referred to as multiport bridges, and are capable of bridging two separate networks. Bridges can create a table of forwarding rules based upon which MAC (media access controller) addresses exist on which ports of the bridge, and pass packets that are destined for an address which is located on an opposite side of the bridge. Bridges typically utilize what is known as the "spanning tree" algorithm to eliminate potential data loops; a data loop is a situation wherein a packet endlessly loops in a network looking for a particular address. The spanning tree algorithm defines a protocol for preventing data loops. Layer 3 switches, sometimes referred to as routers, can forward packets based upon the destination network address. Layer 3 switches are capable of learning addresses and maintaining tables thereof which correspond to port mappings. Processing speed for layer 3 switches can be improved by utilizing specialized high performance hardware, and off loading the host CPU so that instruction decisions do not delay packet forwarding.

In addition, there has also been pressure from the implementers of the computer networks to have network devices to mediate traffic on the computer networks that are extremely flexible and low cost. A network switch that has certain attributes may be a perfect solution for some implementers but is not as easily used for some support solutions or for some implementers. It is also important to these implementers that the switches have long-term flexibility so that as technology changes, the network device does not become prematurely obsolete. While the prior art network devices provide many of these attributes, there is a need for a network devices that are extremely flexible and low cost.

SUMMARY OF THE INVENTION

The present invention is directed to a network device and methods that allow for multiple paths to a destination address to be utilized such that the use of the paths is balanced. The invention is directed to many types of data networks carrying various forms of datagrams. Specific embodiments of the invention may be directed to the handling of packets in an Internet Protocol network, where the destination address is obtained from the IP destination address contained in the packet.

According to one embodiment of the invention, a method of mediating the flow of data packets to a destination in a network is disclosed. The method includes the steps of receiving a datagram at a port of a network device, evaluating a destination address for the datagram based on fields in the incoming packet, searching a longest prefix match (LPM) table using the destination address as a LPM key, determining an address table index and an offset based on entries found in the search of the longest prefix match table, searching an address table using the address table index and the offset as a address key to determine an egress port number of the network device and forwarding the datagram based upon at least the egress port number.

Additionally, the step of evaluating a destination address for the packet may include determining whether the address table contains an entry for a destination IP address contained in the packet. Also, the method may include obtaining an interface number from the searching of the address table and using the interface number to search an interface table to get a router MAC address and a VLAN tag for the packet. In addition, the method may include determining the address table index and the offset comprises obtaining a count value from the searching of the LPM table and using the count value to determine the offset.

In addition, the method may include the step of using the count value to determine the offset comprises determining a modulo of the count value and using the modulo to determine the offset. The method may also include updating entries in the address and LPM tables, such that the count value is equal to a number of entries in the address table that represent paths to a same IP destination address. Also, the method may be performed such that the step of forwarding the datagram includes forwarding the datagram along the paths to the same IP destination address such that each path of the paths is utilized approximately equally.

According to another embodiment, a network device for mediating the flow of datagrams to a destination in a network is disclosed. The device includes receiving means for receiving a datagram at a port of a network device, evaluating means for evaluating a destination address for the datagram based on fields in the incoming datagram, first searching means for searching a longest prefix match (LPM) table using the destination address as a LPM key, determining means for determining an address table index and an offset based on entries found in the search of the longest prefix match table, second searching means for searching an address table using the address table index and the offset as an address key to determine an egress port number of the network device and forwarding means forwarding the datagram based upon at least the egress port number.

According to another embodiment, a network device for handling datagrams is disclosed. The network device includes at least one data port interface, the at least one data port interface supporting a plurality of data ports transmitting and receiving data and a plurality of lookup tables to determine an egress port based on a destination address contained in a datagram received at one of the plurality of data ports. The plurality of lookup tables includes a longest prefix match (LPM) table and an address table and wherein the at least one data port interface is configured to search the LPM table to obtain an entry in the address table containing at least an egress port number of the network device, such that each entry in the address table for the destination address is utilized approximately equally.

These and other variations of the present invention will be described in or be apparent from the following description of the preferred embodiments.

BRIEF DESCRIPTION OF THE DRAWINGS

For the present invention to be easily understood and readily practiced, the present invention will now be described, for purposes of illustration and not limitation, in conjunction with the following figures.

DETAILED DESCRIPTION OF PREFERRED EMBODIMENTS

Figure 1:
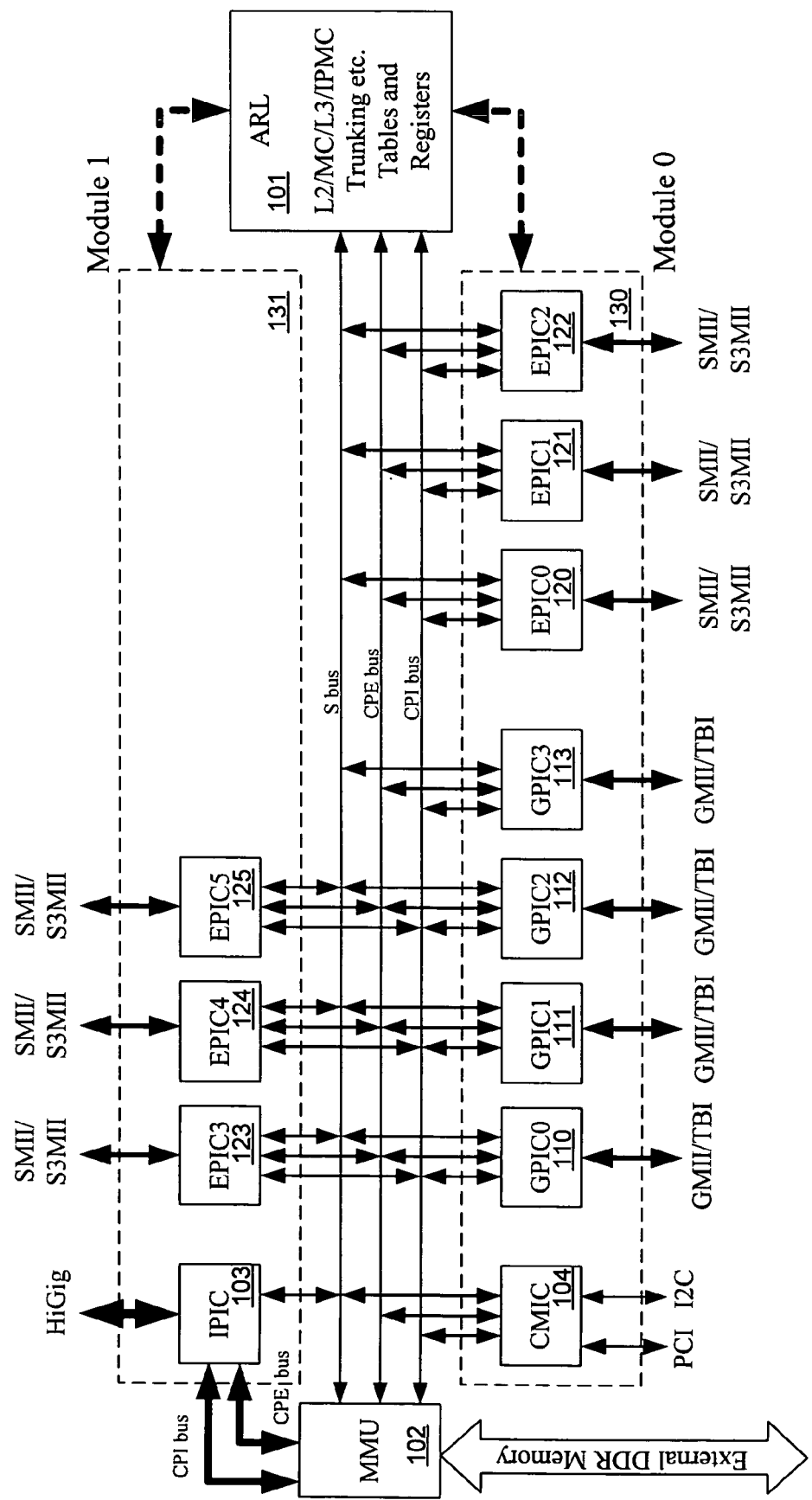
FIG. 1 illustrates a block diagram providing the basic elements of the network device, according to one embodiment of the present invention.

The present invention is directed to a network device that receives data and process that data and may forward that data onto a destination based on attributes of that data. A general schematic of the network device is illustrated in FIG. 1. The device has an address resolution module (ARL) 101 that provides support for Layer 2 (L2), Multicast (MC), Layer 3 (L3), Internet Protocol Multicast (IPMC) switching, as well as Trunking, through various tables and registers. The ARL is connected to elements of the network switch divided into different modules. The ARL is also connected through a bus made up of channels, with data transferred on the CPI bus, protocols transferred therewith on the CPE bus and the S bus which is a sideband bus and is used to transfer signals between portions of the network device.

The bus provides connections between the Memory Management Unit (MMU) and other interface modules. The interface modules include Ethernet Port Interface Controllers (EPICs) 120-125, Gigabit Port Interface Controllers (GPICs) 110-113, Interconnect Port Interface Controller (IPIC) 103, and CPU Management Interface Controller (CMIC) 104. The above components are discussed below. In addition, a Central Processing Unit (CPU) can be used as necessary to program the network device with rules which are appropriate to control packet processing. However, once network device is appropriately programmed or configured, it operates, as much as possible, in a free running manner without communicating with CPU.

As discussed above, the network device has two module IDs, with module id 0 covering the Gigabit Ethernet ports, the CMIC and EPICs 0 through 2 and with module id 1 covering the IPIC and EPICs 3 through 5. The device supports 16K MAC address with 256 Layer 2 multicast addresses and 4K VLANs. The device also supports 256 multiple spanning trees and 8 levels of Class of Service. The device also supports protocol based VLANs with priority fields and supports jumbo frames. It also supports Layer 2 Multiprotocol Label Switching (MPLS) and supports classification for multiple packet formats, including Ipv6, Ipv4, double tagged, HTLS, 802.1Q tagged, Ether II and 802.3.

The GPIC modules (110-113) interface to the Gigabit ports and on the medium side it interfaces to the TBI/GMII or MII from 10/100 and on the chip fabric side it interfaces to the bus. Each GPIC supports 1 Gigabit port or a 10/100 Mbps port. Each GPIC performs both the ingress and egress functions. The EPIC modules (120-125) interface to the 10/100-Mbit Ethernet ports and on the medium side it interfaces to the SMII/S3MII and on the chip fabric side it interfaces to the bus. Each EPIC supports an Ethernet port. A standard 802.3u MIIM interface is supported to interface with PHY devices, a standard JTAG interface for boundary scan and an LED interface to control system LEDs.

The IPIC 103 module can interface to the bus on one side and a high speed interface, such as a HiGig™ interface, on the other side. The high speed bus can be, for example, is a XAUI interface, providing a total bandwidth of 10 Gbps. The CMIC 104 block is the gateway to the host CPU. In it's simplest form it provides sequential direct mapped accesses between the CPU and the network device. The bus interface may be a 66 MHz PCI. In addition, an I2C (2-wire serial) bus interface may supported by the CMIC, to accommodate low-cost embedded designs where space and cost are a premium.

The device can also support metering, with a granularity of, for example, 64 kb/s, having bucket sizes between 4 k and 512 k. The device may also include counters based on packet number or bytes, with those counters being in-profile, out-profile or general purpose. The device also allows for rate limiting or shaping. The device includes Ingress per port rate limiting, where when the incoming bandwidth exceed a programmed threshold, the port can either send a pause frame or drop packets. The rate control is on a per port basis and support for Egress per port rate limiting.

Support may also be provided for rapid spanning tree protocol that may be deleted by the port and storm control on a per port basis. The network device may also support link aggregation, with, for example, 32 trunk groups, with up to 8 ports in a trunk group. Trunking is also supported across modules and the load may be distributed based on source MAC or IP address and/or destination MAC or IP address.

The packet buffer memory of the device may include external DDR SDRAM memory with a 128 data bit DDR SDRAM interface, configured as 4 independent channels. Each channel consists of 32 data bits and it own address and control signals. The network device supports 32 MB or 64 MB packet buffer memory size, X16 and X32 DDR SDRAM memory and 166 MHz to 200 MHz clock DDR SDRAM memory. For reliability and signal integrity, there support for CRC16 on every pointer, CRC5 on every cell and CRC32 on every frame. There is also support for a packet aging mechanism based on packet time stamp.

A fast filtering processor (FFP) is incorporated into the EPICs and GPICs, in order to accelerate packet forwarding and enhance packet flow. The FFP is essentially a state machine driven programmable rules engine. Filters are applied to packets received by the FFP, through the use of masks so that certain fields of a packet may be evaluated. The filters utilized by FFP are defined by a rules table, where that table is completely programmable by the CPU, through the CMIC. The actions taken based on the filtering of the FFP include 802.1p tag insertion, 802.1p priority mapping, IP TOS (type-of-service) tag insertion, sending of the packet to the CPU, discarding or dropping of the packet and forwarding the packet to an egress port.

The network device may also provide supports for differentiated services. The differentiated services may include metering, per ingress port and per flow, policing, per egress port, re-marking, including DSCP (IPv4 and IPv6) re-marking, re-marking based on inclusive or exclusive matches in the FFP, and classification based on incoming DSCP, and dropping, as a result of metering or filtering. A pulse may be used to refresh all meters across the network device, including ingress metering, FFP metering, egress metering and WFQ MMU meters.

There are several mechanisms for buffering of packets and advanced methods for controlling the flow of packets. These include cell-based Head Of Line (HOL) blocking prevention that is programmable and is based on the total packet memory used by each Class of Service (CoS) per port. Packet-based HOL blocking prevention is also programmable and is based on the number of packets per CoS queue for each port. These mechanisms also support tail drop for CNG for HOL of 25%, 50%, 75% and 100% and supports centralized per port HOL counter. The mechanisms may also address back pressure, per ingress port and per flow through the FFP. The latter includes pause frame support (symmetric and asymmetric IEEE 802.3x) and a jamming mechanism for half-duplex ports. A Weighted Random Early Detection (WRED) congestion control per CoS queue per port is also available. Random Early Detection is a congestion avoidance mechanism that takes advantage of TCP's congestion control mechanism. By randomly dropping packets prior to periods of high congestion, RED tells the packet source to decrease its transmission rate. Assuming the packet source is using TCP, it will decrease its transmission rate until all the packets reach their destination, indicating that the congestion is cleared.

Figure 2:
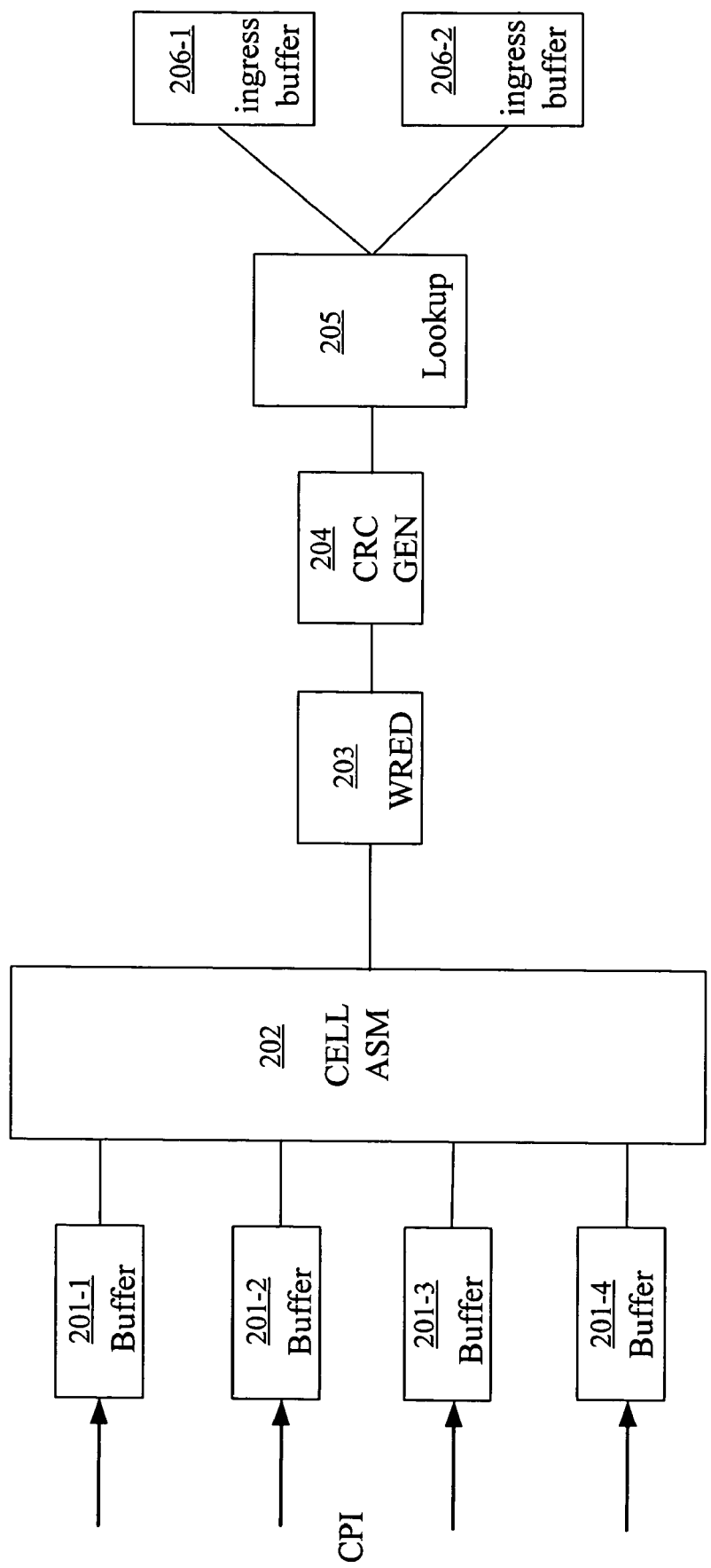
FIG. 2 provides a block diagram illustrating elements used to receive packets by the network switch, according to one embodiment of the present invention.
Figure 3:
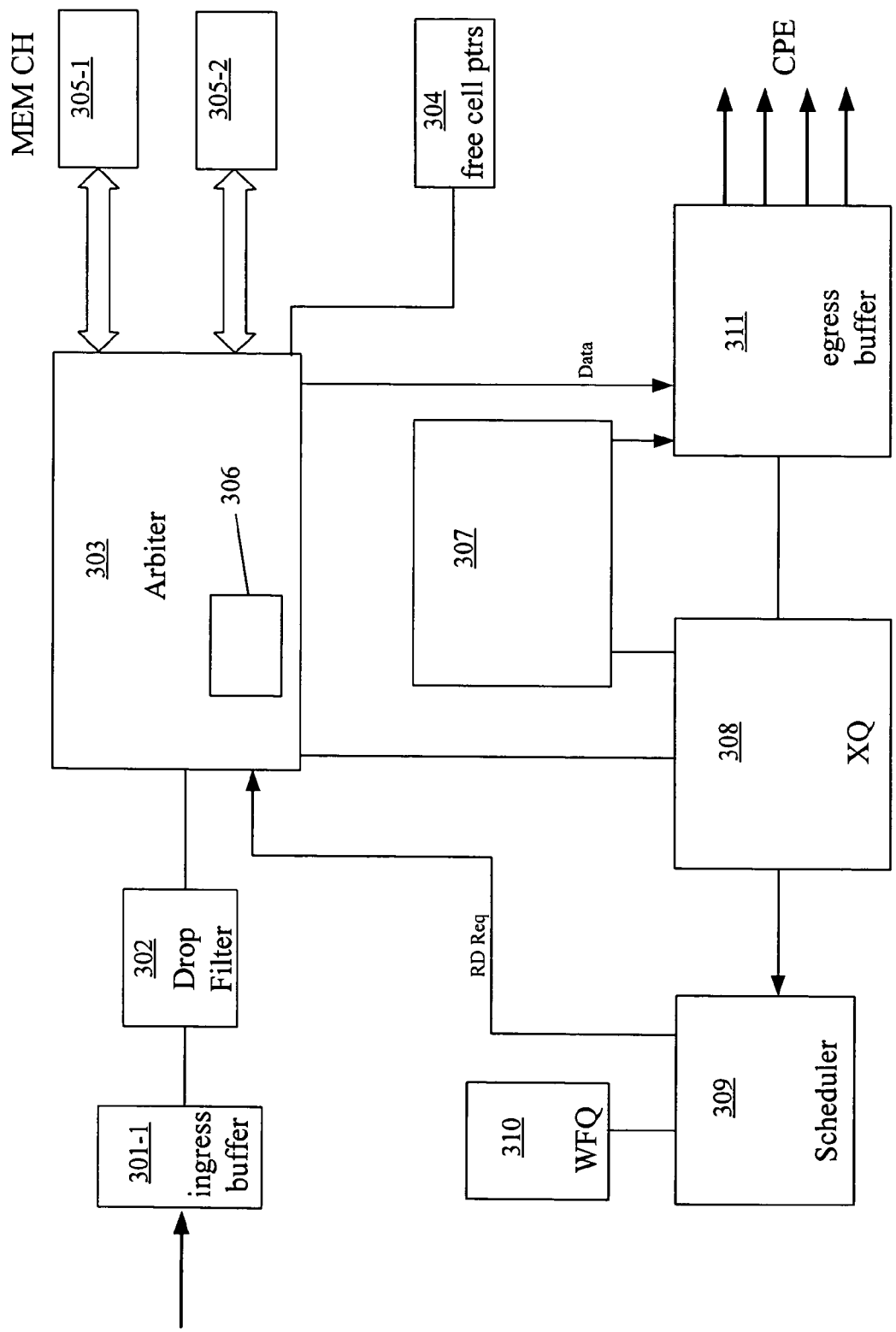
FIG. 3 provides a block diagram illustrating elements used to process packets by the network switch, according to one embodiment of the present invention.

Portions of the ingress and processing elements of the network device, according to one embodiment, are illustrated in FIGS. 2 and 3. FIG. 2 illustrates several buffers 201-1 through 201-4 for receiving packet data. The buffers pass the data to the cell assembler 202 and are then passed to the Weighted Random Early Detection (WRED) 203 module to provide congestion avoidance by dropping packets as needed based on IP precedence. The data is then passed to a for cyclic redundancy check (CRC) 204 module to detect data transmission errors. The data is subsequently passed to a lookup 205 module and then to ingress buffers 206-1 and 206-2. Thereafter, the data passes from the ingress buffer 301-1, in FIG. 3, to a drop filter 302 that may drop the packet based on programmed criteria. The packet data then passes to an arbiter 303, that has its own random access memory 306. The arbiter controls access to the memory channels 305-1 and 305-2 where packet data is stored. The arbiter communicates with a free cell pointer module 304 that provides a pointer to the next available free cells in the memory. The arbiter also is in communication with the egress queue 308 and egress buffer 311 modules. The egress buffer receives the packet data when it is ready to be sent out on the CPE interface. The egress queue module is also in communication with a scheduler 309 that schedules which packets and in what order they are sent out. The scheduler also communicates with a weighted fair queue 310 module to assist in making scheduling decisions, where those decisions result in specific read requests being sent to the arbiter.

Figure 4:
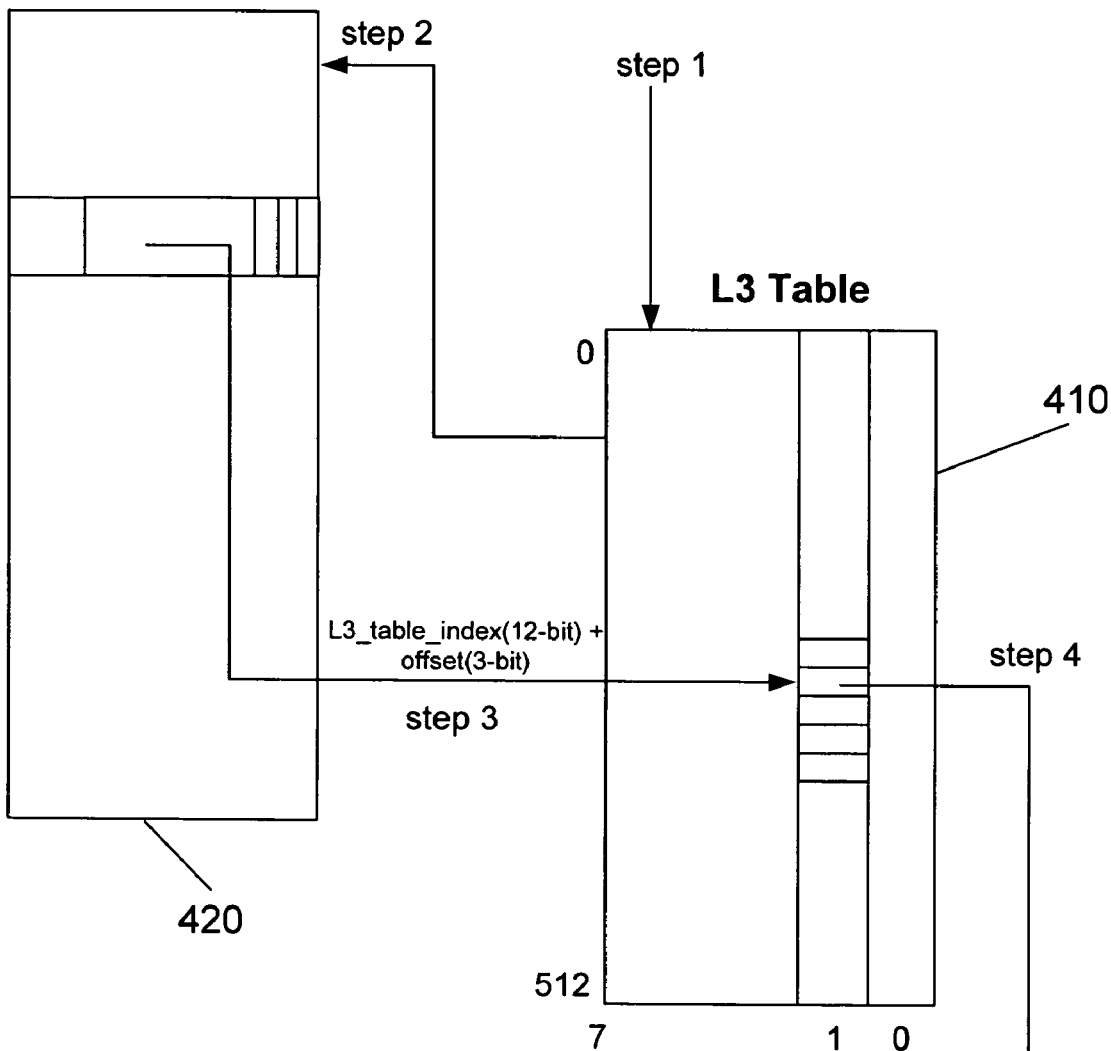
FIG. 4 provides a block diagram illustrating load balancing using tables of the network device, according to one embodiment of the present invention.
Figure 4:
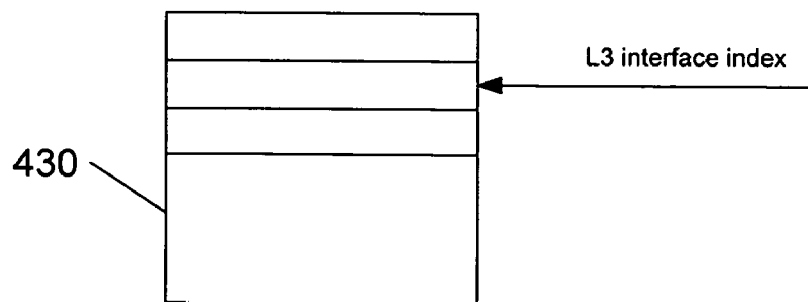

Equal Cost Multiple Path (ECMP) implementation is basically a Layer 3 load balancing application that is implemented in the network device. The process is illustrated, according to one embodiment, diagrammatically in FIG. 4 and in a flow chart in FIG. 5. In prior art devices, there was no ECMP support and thus a lookup of the path to an IP destination address would often lead to a single route, although multiple routes to the IP destination address are available.

In one embodiment of the present invention, a Layer 3 table 410 is used as a routing table (step 1). A Longest Prefix Match (LPM) table 420 is used for longest-prefix matching (step 2) to support the ECMP. The entries in the L3 table are grouped to support the multiple paths. Thus for a given IP address, a longest prefix match is made through the LPM table. In the LPM table, at the entry found through the longest prefix match is a field called the count field. The count field is populated based on the number of equal cost paths for a particular IP route. For example, if the count was "4", that would mean that the are four paths are calculated to be of equal cost for that packet to the destination IP address.

After the LPM search, an L3 pointer points to an entry in the L3 table, so that the next hop or next address can be obtained (step 3). At the same time another index is used to index the L3 interface table 430 to get the router MAC and the VLANID of the router (step 4). The L3 pointer is determined from taking the hash of the source and destination IP addresses and hashing through a 16-bit address to get the base pointer. Thereafter, the lower 8 bits are examined. Thereafter the modulo of the count is taken is taken to determine an offset and added to the lower 8 bits of the hash function. This provides an exact pointer back to the L3 table to get the route dimension.

Thus, given the that the L3 table has route information entries to the destination IP address equal to the count, the use of the above method allows for any of the equal cost paths to be chosen in a random manner. The implementation is beneficial in that multiple paths are utilized and it can be implemented to achieve diversification with minimum changes to the hardware, when compared to the prior art methods.

Figure 5:
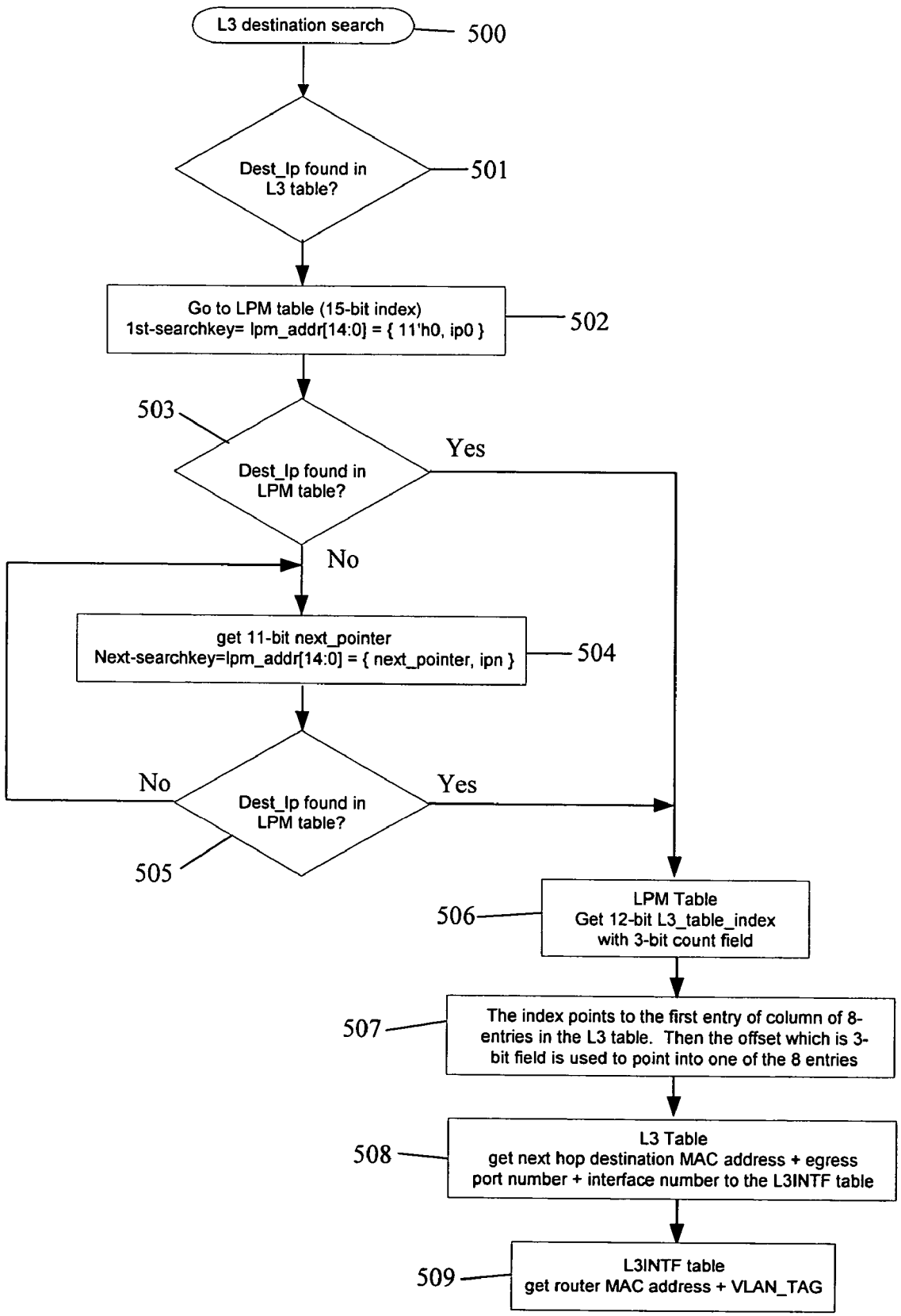
FIG. 5 illustrates a flow chart showing the process of balancing the load between paths to a destination, according to one embodiment of the present invention.

The process is also illustrated, according to at least one embodiment, in FIG. 5. An L3 destination search is begun, in step 500, and it is determined whether the destination IP address in found in the L3 table, in step 501. The LPM table is searched, step 502, and a determination is made whether the destination IP address is found therein, in step 503. Each LPM entry contains a valid bit and a stop bit. Once the LPM table address is formed as illustrated in FIG. 5., i.e. {(10'h0, ip0}, the LPM table content indexed is read out and both the valid bit and the stop bit is checked for further action. If the valid bit is not set, then the LPM search is terminated and considered as a miss. There is a default IP route supported in the network device, it will be returned (if programmed by the software) on such a LPM miss termination condition. However, if the valid bit is set, but not the stop bit, the LPM search continues. The next LPM indexed is formed, in step 504, and the LPM search continues until either both valid and stop bits are set in an entry or after 8 iterations that all 32-bit IP destination address are exhausted. If the first case is true, then the LPM content is examined and point back to L3 routing table for further process. On the other hand, if later case is true, the miss termination condition and the default IP route is returned. The L3 table index is determined from the LPM table, step 506, and the next hop destination MAC address and the egress port number are obtained, steps 507-509.

The MMU and scheduling mechanism may take into account strict priority (SP) and weighted round robin (WRR) weighted fair queuing, that is programmable per CoS per port. The mechanism may also include Weighted Fair Queuing (WFQ) that employs a bandwidth minimum and maximum per CoS queue. The WFQ provides a certain minimum bandwidth to all queues for transmission, where the minimum is supplied per queue and then the remaining bandwidth, up to a configured maximum bandwidth, is distributed either by priority or in a round robin fashion. This provides for a controllable CoS behavior while not allowing starvation of low priority queues.

The scheduling can also utilize combinations of the above prioritization. Utilizing SP and WRR, high priority queues are scheduled on a strict priority basis while the remaining queues are scheduled in a WRR fashion. The configured maximum bandwidth is first supplied per SP configured queue and any remaining bandwidth, up to the configured maximum bandwidth, is distributed among the WRR configured queue. Similarly, SP and WFQ may be applied such that high priority queues are scheduled on a strict priority basis while the remaining queues are scheduled in a WFQ fashion, where a configured guaranteed bandwidth is first supplied with any remaining distributed through WFQ.

One aspect of the MMU, according to one embodiment of the present invention, is the use of a Ping/pong memory access implementation. One problem with using DRAM is random row cycle time due the random nature of egress cell requests. The access time is often 60 ns ($t_{RC}$) for 64 byte packets. The maximum worst case of Ethernet bandwidth is then $(64+20)*8/(2*60)=5.6$ Gb/s. This is the case even with 10,000 bit IO running at 10 GHz.

One possible solution to this lag might be to use RAM with lower $t_{RC}$, but that would be more expensive and thus raise the cost of the network device. Alternately, according to an embodiment of the present invention, a dual port memory scheme may be emulated that achieves a maximum Ethernet bandwidth of 11.2 Gb/s.

In order to emulate a dual port memory, a ping/pong concept is employed. Instead of using one logic memory block 128 bits wide, two logic memory blocks 64 bits wide may be employed, for example. A read request selects a memory block first (ping) and write use of the other one (pong) occurs. For non-fixed cell sizes, read cells to the same destination could be out of sequence, so this must be especially addressed. The process also provides a service guarantee in that even if all reads for some time must go to memory block 0, the full read bandwidth is available (i.e. tRC is limited).

In order to implement the Ping/pong memory access, frames are stored as a linked list of cells, with the pointer to the next cell written together with the current cell. The process makes write decisions just-in-time, with no way of knowing where the next cell will be written. This can create a problem when the current cell of a frame is written, the location of the next cell write also has to be written, but this location is not yet known. As a solution, two possible next pointers are written into the current cell, with a 1-bit record kept internally per cell location, updated after the next cell was written, indicating which next pointer the next cell was actually used.

In other implementations of the MU, an improved multicast pointer system is developed. In the prior art implementation, memory is shared. Only one copy of a multicast frame is stored, as opposed to storing a copy per destination. Thereafter, for a multicast packet, it is necessary to keep track of when the resources allocated for this frame can be released. Usually done by using a counter per cell, initialized when the cell is written, and decremented every time the cell is read. When the count reaches zero, the resource may deallocated. This scheme presents a problem when using large external memories as frame buffers. The number of cells can be huge so that the required memory for storing the counts can be appreciable. For example, if the number of cells is 200 k and the count is 6 bits in length, the required memory for storing the counts would be 1.2 Mbit or approximately 3.1 mm$^2$ of space on the chip. Alternatively, the count may be embedded in the cell, but this requires extra bandwidth to update the count after each read.

The present invention, according to one embodiment, utilizes a pointer based system, where a multicast pointer is embedded per frame. With the multicast counts being stored in a shared structure, this limits the total number of concurrent multicast flows. In the case of the example discussed above, those concurrent multicast flows would be limited to less than 8 k.

In addition, a weighted fair queuing implementation may also be used with the MMU of the present invention. One communication channel is shared between several traffic classes in a predetermined manner to guarantee a minimum bandwidth per traffic class. The normal implementation of a weighted fair queue is using current packet size to determine which is next in line for transmission, based on a calculated end transmission time for each packet at the head of the queue. Knowing a packet size up-front is very expensive from a memory allocation perspective. For example for 200 k packets times a size entry of 14 bits equals 2.8 Mbit or approximately 7.3 mm$^2$ of space.

One solution to this problem, utilized in some of the embodiments of the present invention, is to use a leaky bucket approach, with the leak being equal to the required minimum bandwidth. The size of cells later being read from memory and sent to the egress port are additions to the bucket. Thus, knowledge of the frame size info is not required up-front and a minimum bandwidth per traffic class can be guaranteed.

The MMU also incorporates multi-threading of the high-capacity or HiGig port using two independent threads to feed the 10 Gb HiGig port, according to one embodiment. The prior problem concerns the use of external memory and embedding the next cell pointer in each memory cell. The time that it takes from one cell being read until the address of the next cell is available, limits the maximum bandwidth for a given egress port flow to below 10 Gb/s. Storing the next cell pointer internally would require 200 k cells*17 bits=3.4 Mbit or 8.8 mm$^2$. As a solution, the 10 Gb/s flow is separated into two or more independent threads. In order to not get out-of-sequence packets, the threads have to map unique flows, in this case distinguished by a source port number.

The present invention also addresses the following problem, according to one embodiment. For some configurations, such as using slow DDR333 SDRAM, the memory system will be blocked. Normally this would require the MMU to start dropping packets immediately, leading to poor performance, even if the overload is only coming in bursts. The solution, implemented in embodiments of the present invention, is to add an ingress buffer, which is able to absorb the burstiness, signaling to the MMU egress when above a programmed watermark. This allows the MMU egress to stop transmitting new frames, but keeping ongoing frames running, until below the watermark again.

The network device also has many features supporting Layer 3 switching. For unicast L3 switching, there are 512 L3 interfaces, 4 k host table, 16 k LPM tables and ECMP support for up to 8 paths. There is also the ability to support load distribution for L3 switching across a trunk group and support for L3 entry insertion and deletion to assist routing software to perform faster updates. The IP multicast table supports 256 entries and contains Source Port/TGID, TTL threshold, CoS, L2 and L3 bitmaps.

With respect to IPMC packet replication, both GE and FE ports support 256 IPMC groups. Up to 32 VLANs per port for replication in GE ports and 8 VLANs per port for replication in FE ports are supported. The packets reside in the MMU until the whole replication is done, but may be suspended to serve higher priority packets.

The IPMC replication flow occurs as follows. The IP multicast group number is used to index into the IP multicast group vector table. Each bit position in this table is the index into the IP multicast VLAN ID table. The VLAN ID table stores the VLAN IDs corresponding to each bit position in the IP Multicast Group Vector Table entry. The packet is replicated and forwarded onto each VLAN ID in the IP multicast VLAN ID table, for which a bit is set to "1" in the IP multicast group vector table. If the incoming VLAN ID of the packet is the same as the VLAN ID from the VLAN ID table, the packet is L2 forwarded. If the untagged bit for this port is set, then the packet will be sent out as untagged. Otherwise, it is sent out as tagged. There is an option to replace the SA of the packet with the router SA even for L2 IPMC switching. If the incoming VLAN ID of the packet is different, the packet is routed on to the outgoing VLAN. The IP TTL is decremented and the IP checksum is recalculated. The SA of the packet is replaced with the IP Multicast router MAC address.

IPMC requires several tables that are required to implement the operation; which portions will be implemented in the MMU; which portions will be implemented in the egress module.

IPMC packet replication is supported on both Gigabit ports and Fast Ethernet ports. However, the requirements are slightly different between different type of ports. For Gigabit ports, the maximum number of VLANs supported for replication is 32. For Fast Ethernet ports, the maximum number of VLANs supported for replication is 8. Both Gigabit ports and FE ports supports 256 IPMC group.

The following register, as provided in TABLE 1, is used in each port, according to one embodiment:

TABLE 1

| Fields | Regs Name | # of Bits | Description |
|---|---|---|---|
| TTL Threshold | TTL | 8 | The TTL threshold for the outgoing Multicast packet. Packet having TTL threshold below this are not L3 switched |
| MAC Address | MAC SA | 48 | The outgoing multicast packet is replaced with this source MAC address |

Each GPIC has one such register and each EPIC has eight, one for each FE port.

The following IPMC group vector tables are also used in some embodiments, with the table in TABLE 2 being used in the GPICs and the table in TABLE 3 being used in the EPICs.

TABLE 2

| Entries | Bitmap (32 bits) |
|---|---|
| 0 | 01010001000000101000100000010100 |
| 1 | 10000101000100100010001000001001 |
| ... | |
| ... | |
| 255 | |

TABLE 3

| Entries | Bitmap (64 bits) | | | |
|---|---|---|---|---|
| | FE 0 | FE 1 | ... | FE 7 |
| 0 | 01010001 | 00000010 | ... | 00010100 |
| 1 | 10000101 | 00010010 | ... | 00001001 |
| ... | | | ... | |
| 255 | | | ... | |

In addition, each GPIC has one IPMC Group Vector Table (256*32=8K bits) and each EPIC has one IPMC Group Vector Table (256*8*8 ports 16K bits).

Each GPIC has one IPMC VLAN ID Table (32*12=384 bits). Each EPIC has one IPMC VLAN ID Table (8*12*8 ports=768 bits). In order for the MMU to lookup the replicate count, the following tables will be needed inside the MMU: Replicate Count Table (for all Gig ports): 256 IPMC group*4 ports*5 bit=5K bits and Replicate Count Table (for all FE ports): 256 IPMC group*48 ports*3 bit=36K bits. Besides the Replicate Count Table, the MMU also needs to keep track of the number of copies (copy count) that the packet has been duplicated.

Figure 6:
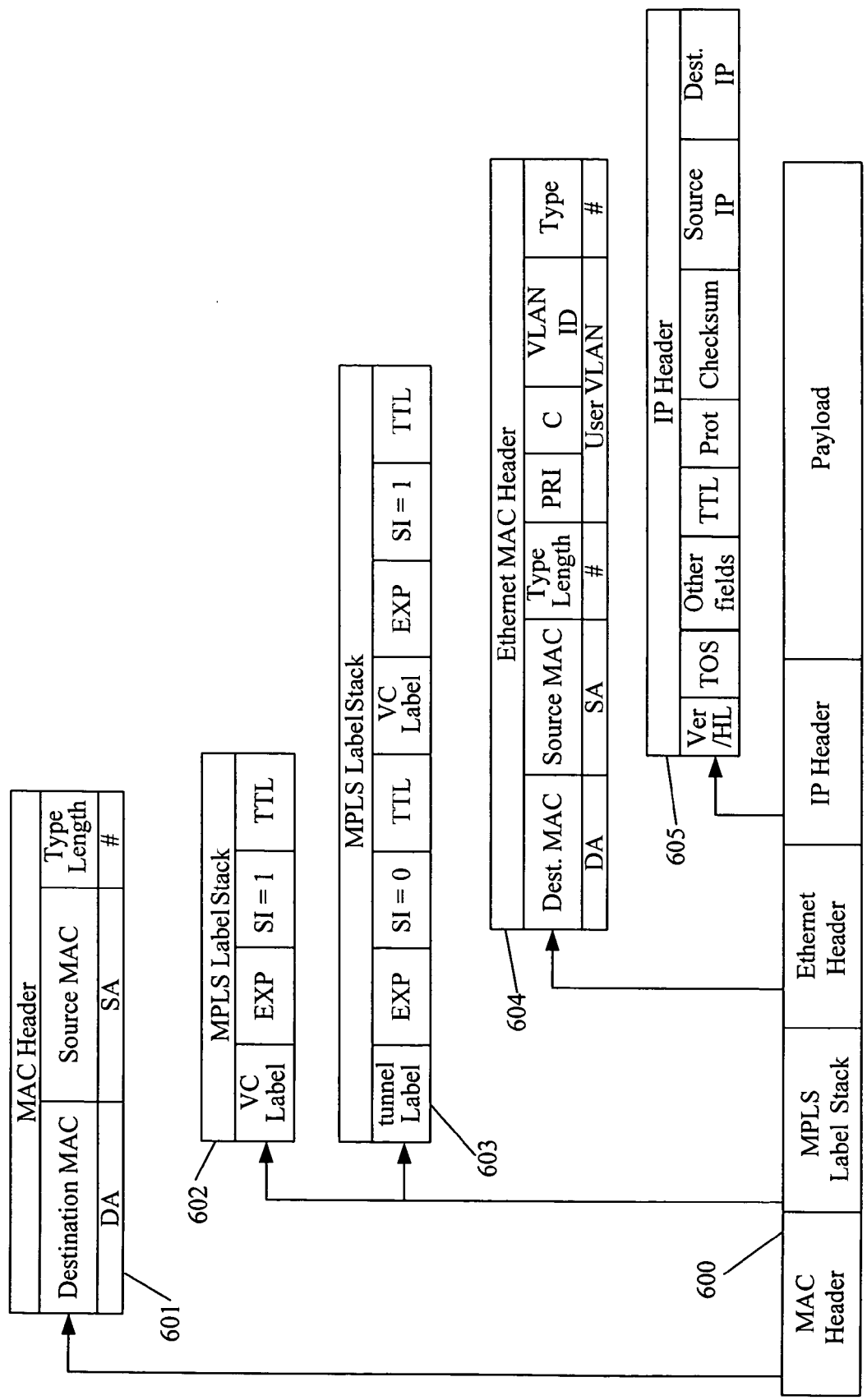
FIG. 6 illustrates a packet format used in label switching, according to one embodiment of the present invention.

The network device, according to certain embodiments, also supports double tagging of packets. The device supports an unqualified learning/forwarding mode and 802.1Q double tagging. The HTLS packet format is supported including 256 VC labels. VC labels may be re-marked in the FFP and a tunnel label my also be inserted in the HTLS header. The packet format is illustrated in FIG. 6. The packet 600 has a MAC header 601, a MPLS Label Stack 602 or 603, based on whether the tunnel label is included, and both a Ethernet MAC header 604 and an IP header 605.

In double tagging HTLS, HTLS is on top of the double tagging because UPRS translation to a SPVID is performed and within a switch, SPVID is used to route a packet. Thus a translation from a HTLS domain to a double tagging domain allows for the packet to be forwarded based on the SPVID. The VC label information is carried into the chip and when the packet is sent to the uplink, that VC label information is used to form the HTLS header. The packet is sent out with the HTLS header and all unique customer packet information.

Figure 7:
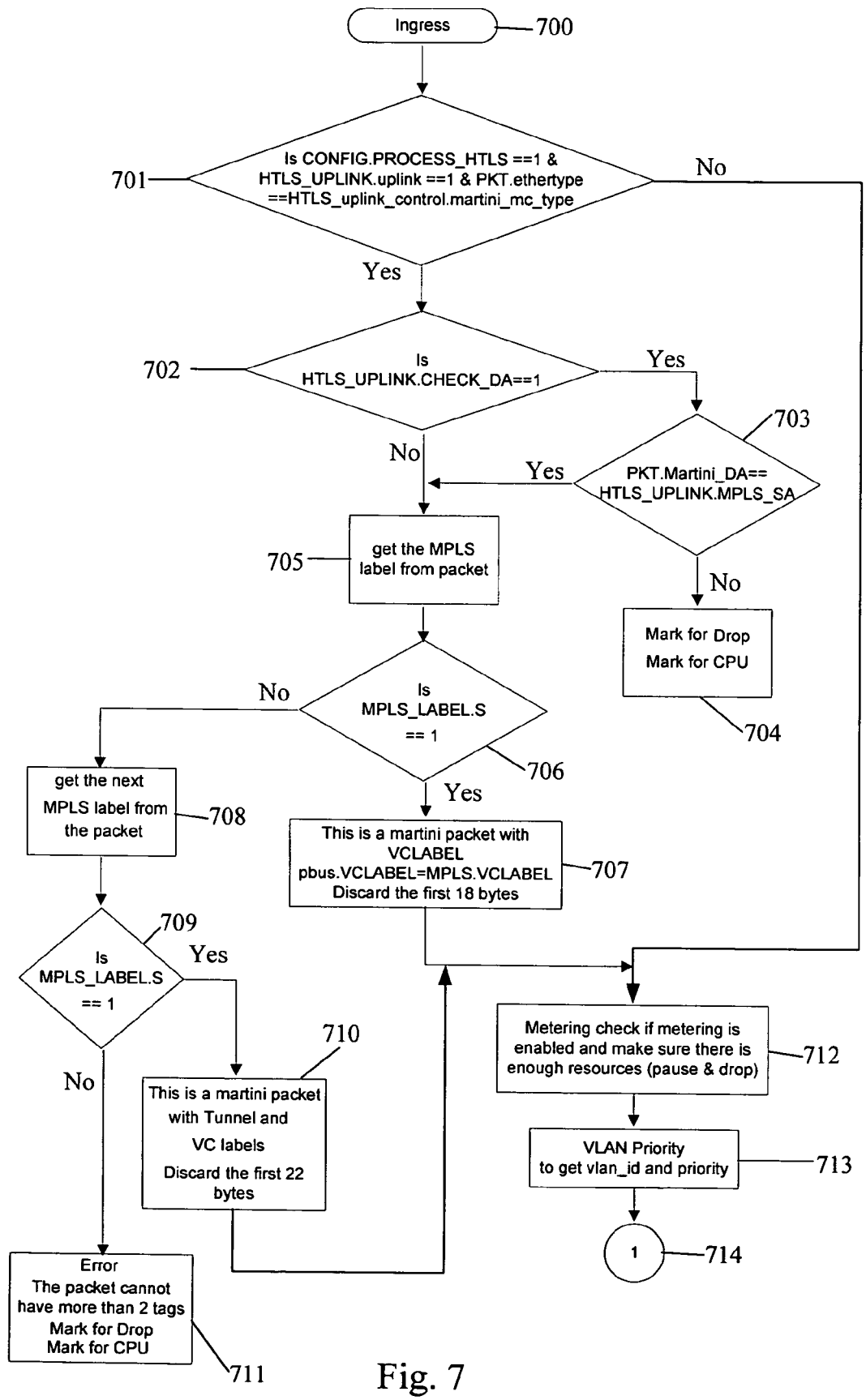
FIG. 7 illustrates a flow chart showing packet flow at the uplink's ingress, according to one embodiment of the present invention.
Figure 8:
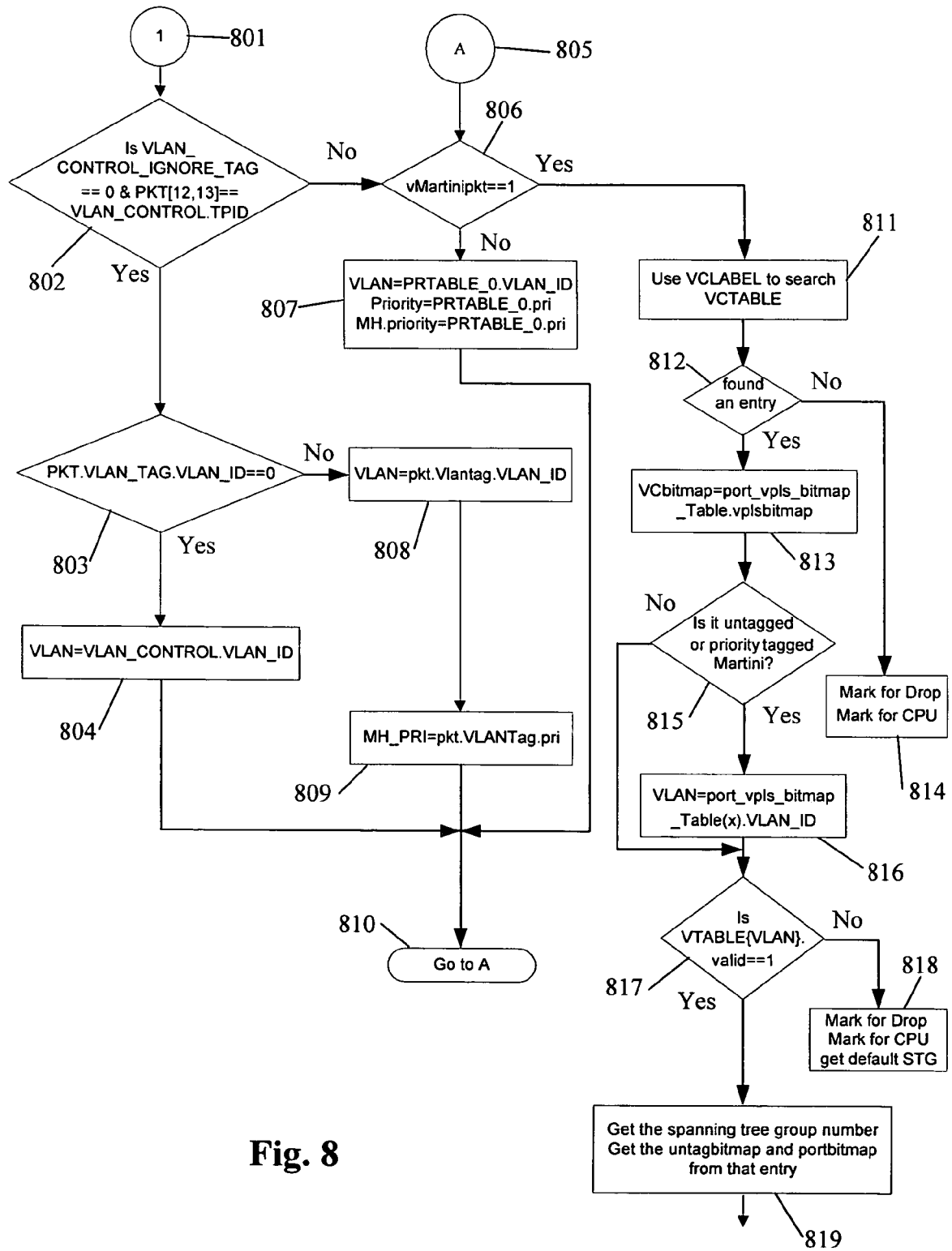
FIG. 8 illustrates a flow chart showing egress processing of packets, according to one embodiment of the present invention.

One example of the process of handling HTLS packets is illustrated in FIGS. 7 and 8. At the ingress, step 700, it is determined what type of packet is being received 701. If the type of the packet is not one a set of types, the flow passes to 712 where it is checked to determine whether metering has been enabled and whether the packet is a controlled packet or has reserved addresses 713. Thereafter the packet data is forwarded to get a VLAN ID and priority 714. If the packet is one of a certain type, then flow passes to 702 to check the uplink destination address. If that is not the case, the destination address is compared to the uplink source address 703, where the packet is marked to be dropped if the addresses are not the same 704. Thereafter, the PLS label is obtained from the packet 705 and a portion of the label is examined 706. Based on that decision, it is determined whether the martini packet is VLAN aware 707 or whether the next PLS label should be obtained from the packet 508. Based on that label 709, either an error is established and the packet is dropped 511 or it is determined that the packet is VLAN unaware. Thereafter, the process of obtaining a VLAN ID and priority are obtained in steps 801-819.

The HTLS format may be translated into other formats, with the tagging occurring when the packet arrives at the chip and then stripped off on the uplink port. The chip provides the wrapper itself and tables and registers are provided to support HTLS. Double tagging occurs when a packet is sent out with two tags. In HTLS, all packets within the chip have two tags. In addition, a different VC label may be assigned to a packet. The VC label may be assigned by default on a per port basis or the FFP may be sued to classify the packet and assign a new VC label for packets coming in from the same port or path. Thus, the VC label information is also carried on top of the double tags inside the chip. On egress, based on the VC label and information in the register, the packet is sent out with one label or two labels in HTLS.

One label technically is a VC label and the optional label is called a tunnel label. The tunnel label can be used to send the packet out on Gig port with the HTLS header. Thus, when the packet is ready to be sent out, the MPLS header may be formed with either the VC label or the VC label plus the tunnel label and sent out. When a packet is received on the Gig port, the device has the ability to parse the MPLS header and recognize that header.

The above-discussed configuration of the invention is, in a preferred embodiment, embodied on a semiconductor substrate, such as silicon, with appropriate semiconductor manufacturing techniques and based upon a circuit layout which would, based upon the embodiments discussed above, be apparent to those skilled in the art. A person of skill in the art with respect to semiconductor design and manufacturing would be able to implement the various modules, interfaces, and tables, buffers, etc. of the present invention onto a single semiconductor substrate, based upon the architectural description discussed above. It would also be within the scope of the invention to implement the disclosed elements of the invention in discrete electronic components, thereby taking advantage of the functional aspects of the invention without maximizing the advantages through the use of a single semiconductor substrate.

Although the invention has been described based upon these preferred embodiments, it would be apparent to those skilled in the art that certain modifications, variations, and alternative constructions would be apparent, while remaining within the spirit and scope of the invention. In order to determine the metes and bounds of the invention, therefore, reference should be made to the appended claims.

The invention claimed is:

1. A network device for handling datagrams, comprising:
   at least one data port interface, said at least one data port interface supporting a plurality of data ports transmitting and receiving data;
   a plurality of lookup tables to determine an egress port based on a destination address contained in a datagram received at one of the plurality of data ports;
   wherein the plurality of lookup tables comprises a longest prefix match (LPM) table and an address table and wherein the at least one data port interface is configured to search the LPM table to obtain an entry in the address table containing at least an egress port number of the network device, such that each entry in the address table for the destination address is utilized approximately equally, wherein each entry in the LPM table contains a count field containing a count value, where the count value is equal to a number of respective entries in the address table for the same destination address.

2. A network device as recited in claim 1, wherein the plurality of lookup tables further comprises an address interface table and wherein the at least one data port interface is configured to search the address interface table to obtain a router MAC address and a VLAN tag for the datagram.

3. A network device as recited in claim 1, wherein the at least one data port interface is configured to update the address table based on changes in destination addresses and update entries in the LPM table to reflect the changes to the address table.

4. A method of mediating the flow of datagrams to a destination in a network, said method comprising:
   receiving a datagram at a port of a network device;
   evaluating a destination address for the datagram based on fields in the incoming datagram;
   searching a longest prefix match (LPM) table using the destination address as a LPM key;
   determining an address table index based on entries found in the search of the longest prefix match table;
   searching an address table using at least the address table index to determine an egress port number of the network device, such that each entry in the address table for the destination address is utilized approximately equally, wherein each entry in the LPM table contains a count field containing a count value, where the count value is equal to a number of respective entries in the address table for the same destination address; and
   forwarding the datagram based upon at least the egress port number.

5. A method as recited in claim 4, wherein the evaluating a destination address for the datagram comprises determining whether the address table contains an entry for a destination IP address contained in the datagram.

6. A method as recited in claim 4, wherein the forwarding the datagram comprises obtaining an interface number from the searching of the address table and using the interface number to search an interface table to obtain a router MAC address and a VLAN tag for the datagram.

7. A method as recited in claim 4, wherein the method further comprises updating entries in the address table and the LPM table, such that the count value is equal to a number of entries in the address table that represent paths to a same IP destination address.

8. A method as recited in claim 7, wherein the forwarding the datagram comprises forwarding the datagram along the paths to the same IP destination address such that each path of the paths is utilized approximately equally.

9. An apparatus for mediating a flow of datagrams to a destination in a network, said apparatus comprising:
   means for receiving a datagram at a port of a network device;
   means for evaluating a destination address for the datagram based on fields in the incoming datagram;
   means for searching a longest prefix match (LPM) table using the destination address as a LPM key;

means for determining an address table index based on entries found in the search of the longest prefix match table;

means for searching an address table using at least the address table index to determine an egress port number of the network device, such that each entry in the address table for the destination address is utilized approximately equally, wherein each entry in the LPM table contains a count field containing a count value, where the count value is equal to a number of respective entries in the address table for the same destination address; and means for forwarding the datagram based upon at least the egress port number.

10. An apparatus as recited in claim 9, wherein the means for evaluating the destination address for the datagram comprises means for determining whether the address table contains an entry for a destination IP address contained in the datagram.

11. An apparatus as recited in claim 9, wherein the means for forwarding the datagram comprises means for obtaining an interface number from the searching of the address table and means for using the interface number to search an interface table to obtain a router MAC address and a VLAN tag for the datagram.

12. An apparatus as recited in claim 9, wherein the apparatus further comprises means for updating entries in the address table and the LPM table, such that the count value is equal to a number of entries in the address table that represent paths to a same IP destination address.

13. An apparatus as recited in claim 12, wherein the means for forwarding the datagram comprises means for forwarding the datagram along the paths to the same IP destination address such that each path of the paths is utilized approximately equally.

* * * * *